United States Patent
Ryu et al.

(10) Patent No.: US 8,869,528 B2
(45) Date of Patent: Oct. 28, 2014

(54) LOW PRESSURE EGR SYSTEM AND METHOD FOR DETERMINING INTAKE AIR LEAKAGE THERETHROUGH

(75) Inventors: Junkyun Ryu, Ansan-si (KR); Kihyun Baek, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 357 days.

(21) Appl. No.: 13/284,607

(22) Filed: Oct. 28, 2011

(65) Prior Publication Data
US 2012/0143459 A1   Jun. 7, 2012

(30) Foreign Application Priority Data
Dec. 6, 2010   (KR) .................. 10-2010-0123200

(51) Int. Cl.
F02B 33/44   (2006.01)
F02M 25/07   (2006.01)
G01M 15/09   (2006.01)

(52) U.S. Cl.
CPC ........... F02M 25/0709 (2013.01); *Y02T 10/121* (2013.01); G01M 15/09 (2013.01)
USPC .. 60/605.2; 60/602; 123/568.16; 123/568.21; 701/108; 701/33.9

(58) Field of Classification Search
USPC .................. 123/568.21, 568.11, 568.16, 295; 701/108, 33.9; 73/118.1, 118.2, 117.3; 60/605.2, 602
See application file for complete search history.

(56) References Cited

U.S. PATENT DOCUMENTS

| | | | |
|---|---|---|---|
| 6,102,016 A * | 8/2000 | Sitar et al. | 123/568.23 |
| 7,493,762 B2 * | 2/2009 | Barbe et al. | 60/605.2 |
| 2005/0161029 A1* | 7/2005 | Ishikawa | 123/568.16 |
| 2006/0266019 A1* | 11/2006 | Ricart-Ugaz | 60/278 |
| 2010/0146966 A1* | 6/2010 | Burkhardt et al. | 60/602 |

FOREIGN PATENT DOCUMENTS

| | | | |
|---|---|---|---|
| JP | 2002004872 A | | 1/2002 |
| JP | 2002047958 A | | 2/2002 |
| JP | 2009209764 A | * | 9/2009 |
| JP | 2010-242640 A | | 10/2010 |
| JP | 2010242617 A | * | 10/2010 |
| KR | 1020030030540 A | | 4/2003 |
| KR | 10-0435682 B1 | | 6/2004 |
| KR | 1020060030601 A | | 4/2006 |
| KR | 1020100001095 A | | 1/2010 |

* cited by examiner

*Primary Examiner* — Thomas Moulis
*Assistant Examiner* — Joseph Dallo
(74) *Attorney, Agent, or Firm* — Morgan, Lewis & Bockius LLP

(57) ABSTRACT

A method for determining intake air leakage in a low pressure EGR system may include a first step of measuring an intake air leaking amount Leak_Air, a second step of determining whether intake air may be leaked by comparing the intake air leaking amount Leak_Air and an intake air leakage determination value Leak_Air_Det with each other, and a third step of notifying leakage information against an intake air leakage when the intake air leakage may be settled.

8 Claims, 2 Drawing Sheets

LOW PRESSURE EGR SYSTEM AND METHOD FOR DETERMINING INTAKE AIR LEAKAGE THERETHROUGH

CROSS-REFERENCE TO RELATED APPLICATIONS

The present application claims priority to Korean Patent Application Number 10-2010-0123200 filed Dec. 6, 2010, the entire contents of which application is incorporated herein for all purposes by this reference.

BACKGROUND OF THE INVENTION

1. Field of the Invention

The present invention relates to a method for determining an intake air leakage to prevent a diesel particulate filter (DPF) from being damaged because particulate matters (PM) are excessively generated to be excessively deposited in the DPF due to a leakage of an intake system in a diesel vehicle with a low pressure EGR (hereinafter, referred to as 'LPEGR') mounted thereon and failures of a turbo charger and an engine from being caused because a part of the damaged DPF is introduced into an LPEGR system.

2. Description of Related Art

According to environmental regulations reinforced in recent years, the reduction of pollutants discharged from a vehicle is the object of the most important research and development in automobile industries of nations all over the world. Reduction measures such as combustion improvement and post-processing of HC, CO, and exhaust fumes in automobile exhaust gas are relatively easy, however, it is difficult to develop nitrogen oxide reducing technology due to a bad influence exerted to consumption and fuel efficiency. An exhaust gas recirculation (EGR) which is an exhaust gas recirculation device used as one of the nitrogen oxide reducing technology has been already commercialized as one of inexpensive and effective methods for reducing nitrogen oxide. $CO_2$ or $H_2O$ of exhaust gas is substituted and mixed with some of intake air, such that a heat capacity of a mixer is increased to suppress an increase in temperature of combustion gas in a cylinder and an excess air factor is decreased to suppress generation of thermal NOx, thereby reducing a total amount of generated NOx. Further, since some of the intake air is substituted with exhaust gas having low oxygen density, the amount of oxygen in a combustion chamber is reduced, and as a result, generation of NOx is suppressed. In particular, the LPEGR developed against reinforcement of NOx regulations has been actively considered to improve fuel efficiency in recent years due to a high NOx reduction effect, and in the prior art, although the PM are excessively deposited in the DPF due to the leakage of the intake air, such that the DPF is damaged, the damaged DPF is not introduced into an engine, and as a result, a failure of the engine does not occur, however, in the LPEGR, some fragments of the damaged DPF are injected into the engine to cause the failures of the turbo charger and the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention has been made in an effort to protect a turbo charger with an LPEGR mounted thereon and an engine by notifying to a driver that a maintenance is required by early diagnosing and judging a leakage of intake air by applying an intake air leakage determining method for measuring and judging the leakage of the intake air to an LPEGR system, in particular, provide different resolution logics by considering that a leakage type is different depending on a leakage location.

In an aspect of the present invention, a method for determining intake air leakage in a low pressure EGR system may include a first step of measuring an intake air leaking amount Leak_Air, a second step of determining whether intake air is leaked by comparing the intake air leaking amount Leak_Air and an intake air leakage determination value Leak_Air_Det with each other, and a third step of notifying leakage information against an intake air leakage when the intake air leakage is settled.

The intake air leaking amount Leak_Air is determined based on an air fuel ratio/an exhaust lambda value, the air fuel ratio is determined based on an engine intake air amount/an injection fuel amount x a theoretical air fuel ratio, and a measurement location of the exhaust lambda value is a rear end of a turbo charger.

In the third step, when the intake air leakage is settled, a malfunction indicator lamp (MIL) is actuated in order to warn the leakage information to a driver as an action against the intake air leakage.

In the third step, when the intake air leakage is settled, the malfunction indicator lamp (MIL) is actuated in order to warn the leakage information to the driver and an operation of an EGR is stopped as an action against the intake air leakage.

In the third step, when the intake air leakage is settled, the malfunction indicator lamp (MIL) is actuated in order to warn the leakage information to the driver, the operation of the EGR is stopped, and an engine torque limiter is actuated, as an action against the intake air leakage.

In the second step, when the intake air leaking amount Leak_Air is smaller than the intake air leakage determination value Leak_Air_Det, an intake air leaking amount accumulation value Leak_Air_Accu is determined by accumulating leaked amount for a predetermined accumulation time and thereafter, when the intake air leaking amount accumulation value Leak_Air_Accu is larger than an intake air leakage accumulation determination value Leak_Air_Inter, the intake air leakage is settled.

In the second step, when the intake air leaking amount Leak_Air is equal to or larger than the intake air leakage determination value Leak_Air_Det, a leakage recognition duration Leak_Air_Dur is compared with an intake air leakage determination time Leak_Air_Time and when the leakage recognition duration Leak_Air_Dur is larger than the intake air leakage determination time Leak_Air_Time, the leakage is settled.

In the second step, when the intake air leaking amount Leak_Air is smaller than the intake air leakage determination value Leak_Air_Det, the intake air leaking amount accumulation value Leak_Air_Accu is determined by accumulating leaked amount for a predetermined accumulation time and thereafter, when the intake air leaking amount accumulation value Leak_Air_Accu is larger than the intake air leakage accumulation determination value Leak_Air_Inter, the intake air leakage is settled, and when the intake air leaking amount Leak_Air is equal to or larger than the intake air leakage determination value Leak_Air_Det, the leakage recognition duration Leak_Air_Dur is compared with the intake air leakage determination time Leak_Air_Time, and when the leakage recognition duration Leak_Air_Dur is larger than the intake air leakage determination time Leak_Air_Time, the intake air leakage is settled.

In another aspect of the present invention, a low pressure EGR system of a diesel engine may include a turbo charger, a lambda sensor positioned at the downstream of the turbo charger, and a DOC (diesel oxidation catalyst) and a DPF (diesel particulate filter) positioned at the downstream of the turbo charger which are an exhaust gas purifying device, are sequentially connected to an exhaust manifold of the diesel engine, wherein the exhaust gas is introduced into an intake manifold from a high pressure EGR (HPEGR) at a front end of the turbo charger and introduced into the intake manifold through a low pressure EGR (LPEGR) at a rear end of the turbo charger.

According to an exemplary embodiment of the present invention, by suggesting a method of considering that the intake air leaking amount acquired by adding up small intake air leaking amounts for a predetermined time becomes problematic without disregarding the small intake air leaking amount even in the case where an intake air leaking amount (Leak_Air) is small, and judging whether the leakage occurs and intake air is continuously leaked, even though any failure occurs in an intake air system, by early diagnosing the failure and taking appropriate measures against the failure, reliability of an LPEGR system is ensured and a NOx problem accompanied with improvement of automobile fuel efficiency is solved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
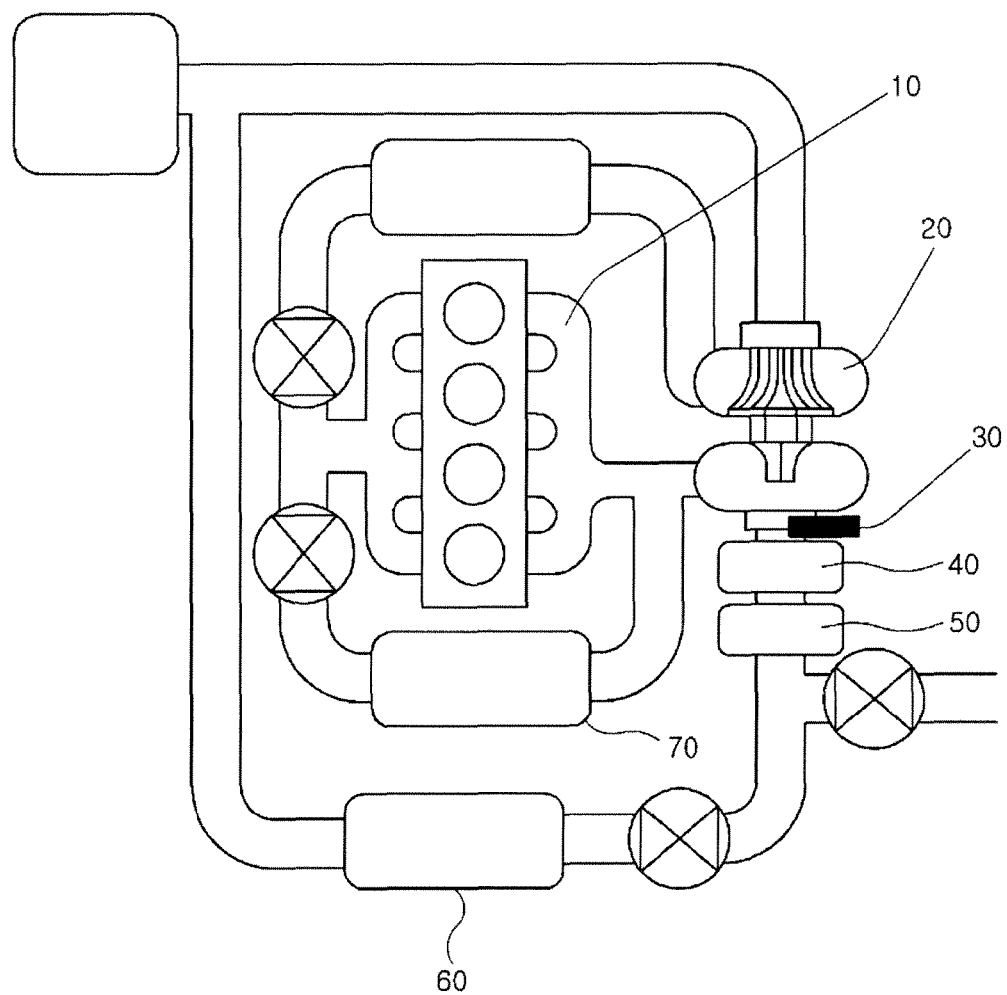
FIG. 1 shows a diesel engine with an EGR system mounted thereon according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

A leakage type of intake air in a turbo charger and an engine system with an LPEGR 60 is classified into two. The first case is that an intake air hose is separated from an intake manifold or an intercooler, and the second case is that a small hole is generated in the intercooler. In the former case, an air leaking amount is very larger, and in the latter case, the air leaking amount is relatively minute. The present invention provides a judgment logic suitable for each of physical phenomena according to the two leakage types.

FIG. 1 is a schematic diagram of a diesel engine with an EGR system mounted thereon. A turbo charger 20, a lambda sensor 30 positioned at the downstream of turbo charger 20, a DOC (diesel oxidation catalyst) 40 which is an exhaust gas purifying device, and a DPF (diesel particulate filter) 50 are, in series, connected to an exhaust manifold of a diesel engine 10 to purify NOx and particulate matters (PM) and the purified exhaust gas is connected to the intake manifold through LPEGR 60 in addition to existing HPEGR 70. In this case, DPF 50 is damaged due to excessive deposition of the PM and fragments of the damaged DPF are introduced into the engine together with charge air to cause failures of turbo charger 20 and engine 10.

Figure 2:
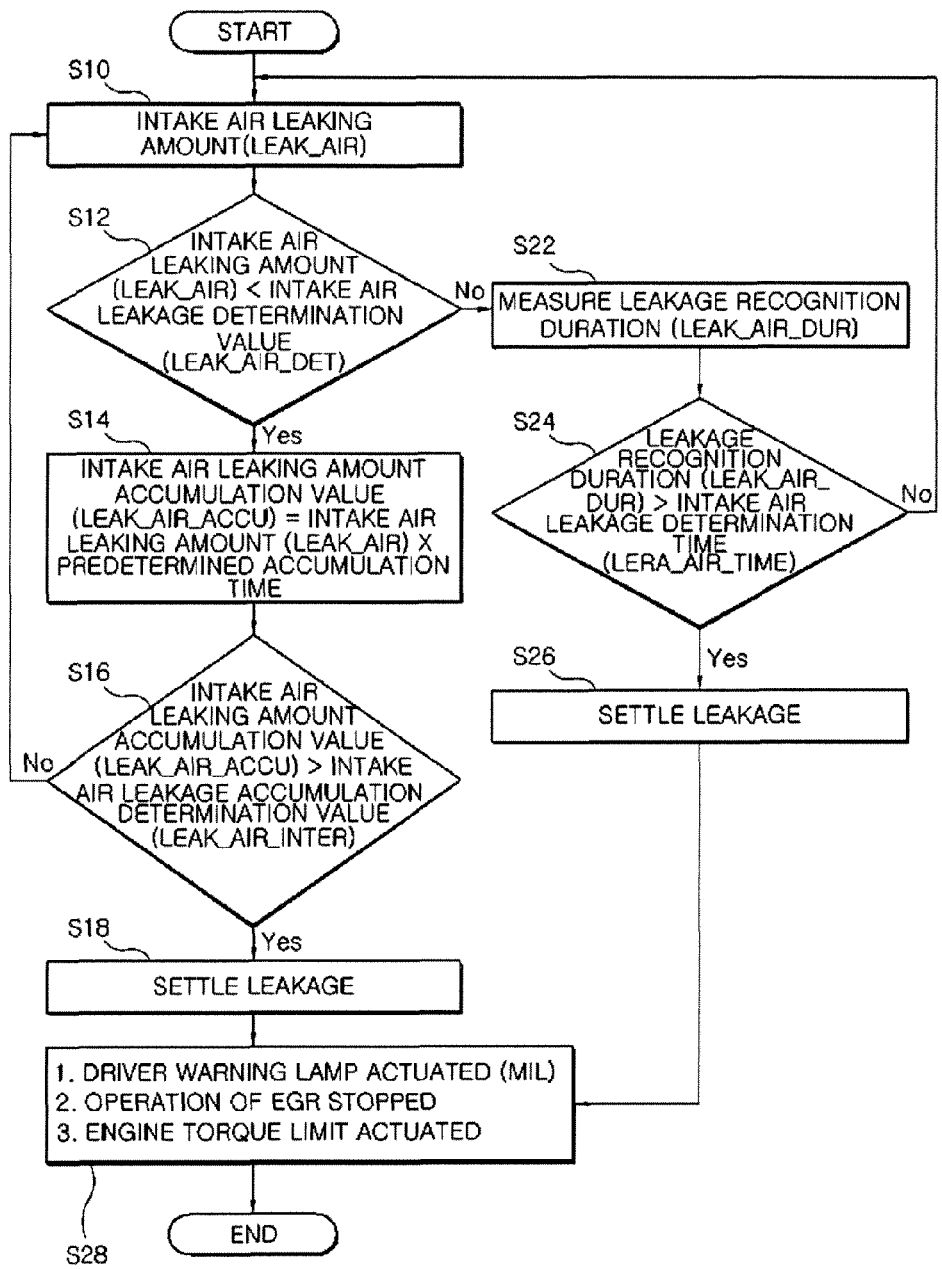
FIG. 2 is a flowchart showing a method for determining an intake air leakage in a diesel engine with a low pressure EGR system according to an exemplary embodiment of the present invention.

FIG. 2 is a flowchart showing a method for determining an intake air leakage in a diesel engine with a low pressure EGR system according to an exemplary embodiment of the present invention.

First, an intake air leaking amount (Leak_Air) is measured in order to recognize a leakage or not (S10). Intake air leaking amount Leak_Air is acquired based on an air fuel ratio÷an exhaust lambda value. In this case, the exhaust lambda value represents a measurement value of a lambda sensor 30 and the air fuel ratio is acquired based on an engine intake air amount÷an injection fuel amount x a theoretical air fuel ratio. Meanwhile, the exhaust lambda value is measured by lambda sensor 30 mounted on a rear end of a turbo charger 20.

Whether intake air is leaked by a small hole in an intercooler or whether intake air is leaked by separation of an air intake system is determined by comparison with an intake air leakage determination value Leak_Air_Det (S12). That is, when intake air leaking amount Leak_Air is smaller than intake air leakage determination value Leak_Air_Det, it is determined that intake air is leaked by the small hole in the intercooler and when intake air leaking amount Leak_Air is equal to or larger than intake air leakage determination value Leak_Air_Det, it is determined that intake air is leaked by separation of the air intake system.

When intake air is leaked by the small hole in the intercooler, it is difficult to immediately detect the intake air leakage differently from a case in which an intake air hose is separated, and as a result, an intake air leaking amount accumulation value Leak_Air_Accu is calculated by accumulating amounts leaked for a predetermined accumulation time (S14). In addition, in step S16, when intake air leaking amount accumulation value Leak_Air_Accu is larger than an intake air leakage accumulation determination value Leak_Air_Inter, the leakage is settled (S18). That is, without disregarding a case in which intake air leaking amount Leak_Air is smaller than intake air leakage determination value Leak_Air_Det, the leakage or not is determined by additionally considering that an intake air leaking amount acquired by adding up intake air leaking amount for a predetermined time is problematic.

Meanwhile, in step S12, intake air leaking amount Leak_Air is compared with intake air leakage determination value Leak_Air_Det and when intake air leaking amount Leak_Air is equal to or larger than predetermined intake air leakage determination value Leak_Air_Det, a leakage recognition duration Leak_Air_Dur acquired by measuring a leakage occurrence duration is acquired in step S22, and in step S24, leakage recognition duration Leak_Air_Dur is compared with an intake air leakage determination time Leak_Air_Time and when leakage recognition duration Leak_Air_Dur is larger than intake air leakage determination time Leak_Air_Time, the leakage is settled (S26).

That is, the leakage is recognized through intake air leaking amount Leak_Air>intake air leakage determination value Leak_Air_Det and if leakage recognition duration Leak_Air_Dur>intake air leakage determination time Leak_Air_Time, the leakage is settled to determine the leakage by additionally considering whether intake air is continuously leaked as well as whether the leakage occurs. The determinations of the leakage may be used independently from each other according to the comparison between intake air leaking amount Leak_Air and intake air leakage determination value Leak_Air_Det.

When the leakage is settled for each of the leakage types in steps S18 and S26, leakage information is notified to a driver through a visual signal such as a malfunction indicator lamp (MIL) or an audio signal, an operation of an EGR is stopped or controlled, or an engine torque limiter is actuated as actions against an intake air leakage and the actions are combined with each other in step S28 to ultimately prevent a turbo charger and an engine from being damaged.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for determining intake air leakage in a low pressure EGR system, the method comprising:
    a first step of measuring an intake air leaking amount Leak_Air;
    a second step of determining whether intake air is leaked by comparing the intake air leaking amount Leak_Air is smaller than an intake air leakage determination value Leak_Air_Det, wherein when it is determined that the intake air leaking amount Leak_Air is smaller than the intake air leakage determination value Leak_Air_Det, the second step further includes:
        accumulating leaked amount for a predetermined accumulation time;
        determining an intake air leaking amount accumulation value Leak_Air_Accu based on the accumulated leaked amount;
        comparing the intake air leaking amount accumulation value Leak_Air_Accu with an intake air leakage accumulation determination value Leak_Air_Inter; and
        settling the intake air leakage when the intake air leaking amount accumulation value Leak_Air_Accu is larger than the intake air leakage accumulation determination value Leak_Air_Inter; and
    a third step of notifying leakage information against an intake air leakage when the intake air leakage is settled.

2. The method as defined in claim 1, wherein the intake air leaking amount Leak_Air is determined based on an air fuel ratio/an exhaust lambda value, the air fuel ratio is determined based on an engine intake air amount/an injection fuel amount x a theoretical air fuel ratio, and a measurement location of the exhaust lambda value is a rear end of a turbo charger.

3. The method as defined in claim 2, wherein in the third step, when the intake air leakage is settled, a malfunction indicator lamp (MIL) is actuated in order to warn the leakage information to a driver as an action against the intake air leakage.

4. The method as defined in claim 2, wherein in the third step, when the intake air leakage is settled, the malfunction indicator lamp (MIL) is actuated in order to warn the leakage information to the driver and an operation of an EGR is stopped as an action against the intake air leakage.

5. The method as defined in claim 2, wherein in the third step, when the intake air leakage is settled, the malfunction indicator lamp (MIL) is actuated in order to warn the leakage information to the driver, the operation of the EGR is stopped, and an engine torque limiter is actuated, as an action against the intake air leakage.

6. The method as defined in claim 1, wherein in the second step, when the intake air leaking amount Leak_Air is equal to or larger than the intake air leakage determination value Leak_Air_Det, a leakage recognition duration Leak_Air_Dur is compared with an intake air leakage determination time Leak_Air_Time and when the leakage recognition duration Leak_Air_Dur is larger than the intake air leakage determination time Leak_Air_Time, the leakage is settled.

7. The method as defined in claim 1, wherein in the second step, when the intake air leaking amount Leak_Air is smaller than the intake air leakage determination value Leak_Air_Det, the intake air leaking amount accumulation value Leak_Air_Accu is determined by accumulating leaked amount for a predetermined accumulation time and thereafter, when the intake air leaking amount accumulation value Leak_Air_Accu is larger than the intake air leakage accumulation determination value Leak_Air_Inter, the intake air leakage is settled, and when the intake air leaking amount Leak_Air is equal to or larger than the intake air leakage determination value Leak_Air_Det, the leakage recognition duration Leak_Air_Dur is compared with the intake air leakage determination time Leak_Air_Time, and when the leakage recognition duration Leak_Air_Dur is larger than the intake air leakage determination time Leak_Air_Time, the intake air leakage is settled.

8. A low pressure EGR system of a diesel engine, comprising a controller executing the method according to claim 1.

* * * * *